US011153785B2

(12) United States Patent
Kweon et al.

(10) Patent No.: US 11,153,785 B2
(45) Date of Patent: Oct. 19, 2021

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Kisuk Kweon, Suwon-si (KR); Sunghoon Kim, Suwon-si (KR); Jungje Son, Suwon-si (KR); Hoyeon Lee, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/593,501

(22) Filed: Oct. 4, 2019

(65) Prior Publication Data
US 2020/0112884 A1 Apr. 9, 2020

(30) Foreign Application Priority Data

Oct. 5, 2018 (KR) .................. 10-2018-0119320

(51) Int. Cl.
*H04W 4/00* (2018.01)
*H04W 28/18* (2009.01)
(52) U.S. Cl.
CPC .................. *H04W 28/18* (2013.01)
(58) Field of Classification Search
CPC ..... H04W 28/16; H04W 28/18; H04W 28/20; H04W 28/22; H04W 28/24; H04W 28/26; H04W 80/10; H04L 65/1066; H04L 67/14
See application file for complete search history.

(56) References Cited

U.S. PATENT DOCUMENTS

| 2018/0206093 | A1 | 7/2018 | Jain et al. |
| 2019/0028337 | A1 | 1/2019 | Ryu et al. |
| 2019/0090298 | A1* | 3/2019 | Abraham ......... H04W 28/0215 |
| 2019/0191330 | A1* | 6/2019 | Dao ................ H04L 12/4633 |

(Continued)

FOREIGN PATENT DOCUMENTS

| EP | 3373620 A1 | 9/2018 |
| WO | 2017-119802 A1 | 7/2017 |

OTHER PUBLICATIONS

International Search Report dated Jan. 17, 2020, issued in an International Application No. PCT/KR2019/012944.

(Continued)

*Primary Examiner* — Matthew W Genack
(74) *Attorney, Agent, or Firm* — Jefferson IP Law, LLP

(57) ABSTRACT

A method of performing communication, by a network exposure function (NEF), in a wireless communication system is provided. The method includes receiving a connection establishment request from a session management function (SMF), based on a protocol data unit (PDU) session establishment procedure performed between the SMF and a user equipment (UE), performing a non-internet protocol (IP) data delivery (NIDD) configuration procedure according to NIDD configuration information included in the connection establishment request, based on whether the NIDD configuration procedure is previously performed on the UE between the NEF and an application function (AF), establishing connection between the SMF and the NEF, and transmitting a connection establishment response to the SMF.

16 Claims, 6 Drawing Sheets

(56) References Cited

U.S. PATENT DOCUMENTS

2019/0261260 A1* 8/2019 Dao .................. H04W 8/20
2020/0100319 A1* 3/2020 Talebi Fard ............ H04W 8/02

OTHER PUBLICATIONS

Samsung; Solution update: NIDD service activation for AMF and SMF; SA WG2 Meeting #128 S2-186887; Vilnius, Lithuania, Jun. 26, 2018, pp. 1-5, 8-13; and figures 1, 4, 6.21.4.2.2-1.
Samsung; Update the solution #30 with the communication establishment between NEF and AF; SA WG2 Meeting #S2-128BIS, S2-188133; Aug. 14, 2018, Sophia Antipolis, France, pp. 2-4; and figures 6.30A.1-1, 630.4.3-1.
CATT; Evaluation of Solution 2; SA WG2 Meeting #128bis S2-188150; Aug. 14, 2018, Sophia Antipolis, France, pp. 2, 6; and figure 6.2A.5-1.

* cited by examiner

METHOD AND APPARATUS FOR TRANSMITTING AND RECEIVING DATA IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0119320, filed on Oct. 5, 2018, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for performing non-internet protocol (non-IP) data transmission and reception.

2. Description of Related Art

To meet the increase in demand with respect to wireless data traffic after the commercialization of 4th generation (4G) communication systems, considerable efforts have been made to develop enhanced $5^{th}$ generation (5G) communication systems (New Radio (NR)). In order to achieve a high data transmission rate, 5G communication systems are designed to be implemented in a super-high frequency band (millimeter wave (mmWave)), e.g., a frequency band of 28 GHz. In order to reduce the occurrence of stray electric waves in such a super-high frequency band and to increase transmission distances of electric waves in 5G communication systems, various technologies are being studied, for example: beamforming, Massive Multiple Input Multiple Output (MIMO), Full Dimensional MIMO (FD-MIMO), array antennas, analog beam-forming, and large-scale antennas. In addition, unlike Long-Term Evolution (LTE) systems, 5G communication systems support various subcarrier spacings, such as 15 kHz, 30 kHz, 60 kHz, and 120 kHz. A physical control channel uses polar coding, and a physical data channel uses Low Density Parity Check (LDPC). In addition, as waveforms for uplink transmission, Cyclic Prefix-Orthogonal Frequency Division Multiplexing (CP-OFDM) as well as Discrete Fourier Transform-Spread-Orthogonal Frequency Division Multiplexing (DFT-S-OFDM) is used. LTE may support Hybrid Automatic Repeat Request (ARQ) (HARQ) retransmission on a Transport Block (TB) basis, and 5G may additionally support HARQ retransmission on a Code Block Group (CBG) basis in which multiple Code Blocks (CBs) are grouped.

In order to improve system networks for 5G communication systems, various technologies have been developed, including evolved small cells, advanced small cells, cloud radio access networks (cloud RAN), ultra-dense networks, Device-to-Device communication (D2D), wireless backhaul, Vehicle-to-Everything (V2X) networks, cooperative communication, Coordinated Multi-Points (CoMP), and interference cancellation.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technical components are required, such as, a sensing technique, wired/wireless communication and network infrastructures, a service interfacing technique, a security technique, and the like. In recent years, techniques including a sensor network for connecting objects, Machine-to-Machine (M2M) communication, Machine Type Communication (MTC), and the like, have been studied.

In the IoT environment, intelligent Internet Technology (IT) services may be provided to collect and interpret data obtained from objects connected to each other, to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, and the like.

Various attempts are being made to apply 5G communication systems to IoT networks. For example, technologies related to sensor networks, M2M communication, MTC, and the like, are implemented by using 5G communication technology including beam-forming, MIMO, array antenna, and the like. The application of cloud RAN as a big data processing technique described above may be an example of convergence of 5G communication technology and IoT technology. As such, a plurality of services may be provided to a user in a communication system. In order to provide a plurality of services to a user, there is a need for a method capable of providing each service within the same time interval according to characteristics, and an apparatus using the same. Various services provided by 5G communication systems have been studied. One of them is a service that satisfies the requirements of low latency and high reliability. This is referred to as Ultra-Reliable and Low-Latency Communication (URLLC).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for performing data transmission without failure when a user using a wireless network utilizes a non-internet protocol (non-IP) Data Delivery (NIDD) service in a wireless communication system.

Additional aspects will be set forth in part in the description which follows and, in part, will be apparent from the description, or may be learned by practice of the presented embodiments.

In accordance with an aspect of the disclosure, a method of performing communication, by a network exposure function (NEF), in a wireless communication system is provided. The method includes receiving a connection establishment request from a session management function (SMF), based on a protocol data unit (PDU) session establishment procedure performed between the SMF and a user equipment (UE), performing a non-IP data delivery (NIDD) configuration procedure according to NIDD configuration information included in the connection establishment request, based on whether the NIDD configuration procedure is previously performed on the UE between the NEF and an application function (AF), establishing connection between the SMF and the NEF, and transmitting a connection establishment response to the SMF.

In accordance with another aspect of the disclosure, a method of performing communication, by an SMF, in a wireless communication system is provided. The method includes performing a PDU session establishment procedure on a UE, transmitting a connection establishment request to an NEF, based on the PDU session establishment procedure performed between the SMF and the UE, establishing connection between the SMF and the NEF, and receiving a connection establishment response from the NEF.

In accordance with another aspect of the disclosure, an NEF for performing communication in a wireless communication system is provided. The NEF includes a transceiver, and at least one processor coupled with the transceiver and configured to control the transceiver to receive a connection establishment request from an SMF, based on a PDU session establishment procedure performed between the SMF and a UE, perform an NIDD configuration procedure according to NIDD configuration information included in the connection establishment request, based on whether the NIDD configuration procedure is previously performed for the UE between the NEF and an AF, establish connection between the SMF and the NEF, and control the transceiver to transmit a connection establishment response to the SMF.

In accordance with another aspect of the disclosure, an SMF for performing communication in a wireless communication system is provided. The SMF includes a transceiver, and at least one processor coupled with the transceiver and configured to perform a PDU session establishment procedure on a UE, control the transceiver to transmit a connection establishment request to an NEF, based on the PDU session establishment procedure performed between the SMF and the UE, establish connection between the SMF and the NEF, and control the transceiver to receive a connection establishment response from the NEF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
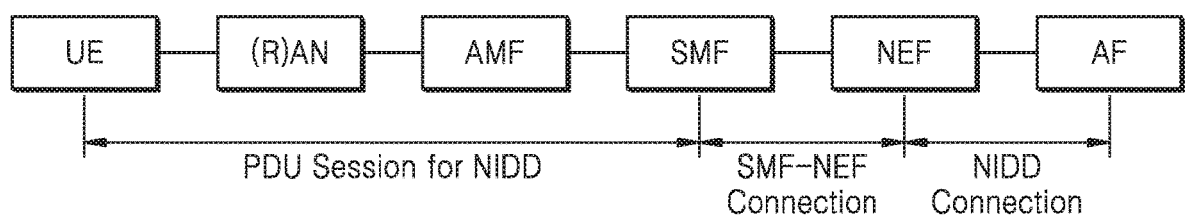
FIG. 1 is a diagram illustrating a non-internet protocol (non-IP) Data Delivery (NIDD) data transmission path according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

In the disclosure, a controller may also be referred to as a processor.

Throughout the specification, a layer (or a layer apparatus) may also be referred to as an entity.

Hereinafter, embodiments of the disclosure will be described with reference to accompanying drawings. In the following description, detailed descriptions of well-known functions or configurations will be omitted when they are considered to unnecessarily obscure the gist of the disclosure. The terms as used herein are those defined by taking the functions of the disclosure into account and may be changed according to the precedents or the intention of users or operators. Therefore, the definitions of those terms should be made according to the overall disclosure set forth herein.

Hereinafter, a base station is a subject that performs resource allocation of a terminal, and may be at least one of eNode B, Node B, base station (BS), Next Generation Radio Access Network (NG RAN), a radio access unit, a base station controller, or a node on a network. The terminal may include an Internet of Things (IoT) equipment, a user equipment (UE), Next Generation UE (NG UE), a mobile station (MS), a cellular phone, a smartphone, a computer, or a multimedia system capable of performing a communication function. In addition, although embodiments of the disclosure will be described by referring to a 5G system as an example, the embodiments of the disclosure may also be applied to other communication systems having a similar technical background. Furthermore, embodiments of the disclosure may be applied to other communication systems through some modifications without departing from the scope of the disclosure, as determined by those of ordinary skill in the art.

While wireless communication systems are evolving from 4G systems to 5G systems, a new core network, NextGen Core (NG Core), is defined. The new core network has virtualized all existing Network Entities (NEs) into Network Functions (NFs). In addition, the new core network may divide a Mobility Management Entity (MME) function into Mobility Management (MM) and Session Messaging (SM), and may manage UE mobility according to a stage based on the usage type of the UE.

5G wireless communication systems need to support various UEs. For example, the 5G wireless communication systems may support various UEs, such as an enhanced Mobile Broadband (eMBB) UE, an Ultra-Reliable Low-Latency Communications (URLLC) UE, and a Cellular Internet of Things (CIoT) UE. Of them, the CIoT UE may exchange a non-internet protocol (non-IP) packet (non-IP data) with an Application Function/Server (AF/AS) for data communication.

In order for the CIoT UE to exchange the non-IP packet (non-IP data) with the server, a configuration between the core network and the service server is required. To this end, a procedure of setting a Non-IP Data Delivery (NIDD) configuration may be performed. An existing NIDD configuration is set only by a server. Therefore, when a UE intends to transmit data, data is not transmitted because the NIDD configuration is not set. In order to overcome this drawback, a method capable of setting an NIDD configuration in a core network is provided.

Meanwhile, Access and Mobility Management Function (AMF), Session Management Function (SMF), Network Exposure Function (NEF), Application Function (AF), and Unified Data Management (UDM) may be used as the same meaning as an AMF apparatus, an SMF apparatus, an NEF apparatus, an AF apparatus, and a UDM apparatus, respectively. Hereinafter, a method of setting an NIDD configuration in a core network will be described with reference to the accompanying drawings.

FIG. 1 is a diagram illustrating an NIDD data transmission path according to an embodiment of the disclosure.

Referring to FIG. 1, a CIoT UE may establish a PDU session over a control plane for non-IP so as to transmit non-IP data to the control plane. Because the UE transmits data to the control plane, a User Plane Function (UPF) may not be included in the data transmission path. Non-IP data may pass through an NEF so as to be delivered to an external AF through an SMF. At this time, in order for the UE to transmit data to the external server AF without an IP address, an NIDD configuration setting procedure needs to be performed between the NEF and the AF. The NIDD configuration setting procedure has been performed only by the AF. Therefore, when the UE does not perform the NIDD configuration setting procedure in advance at the time of establishing the PDU session for data transmission, the PDU session establishment procedure itself could be cancelled.

In an embodiment of the disclosure, the NIDD configuration setting procedure may be performed not only in the AF but also in the core network, that is, the NEF. Therefore, when the UE performs the PDU session establishment procedure, the UE may perform non-IP data transmission by establishing the PDU session regardless of whether the NIDD configuration has been previously performed.

Figure 2:
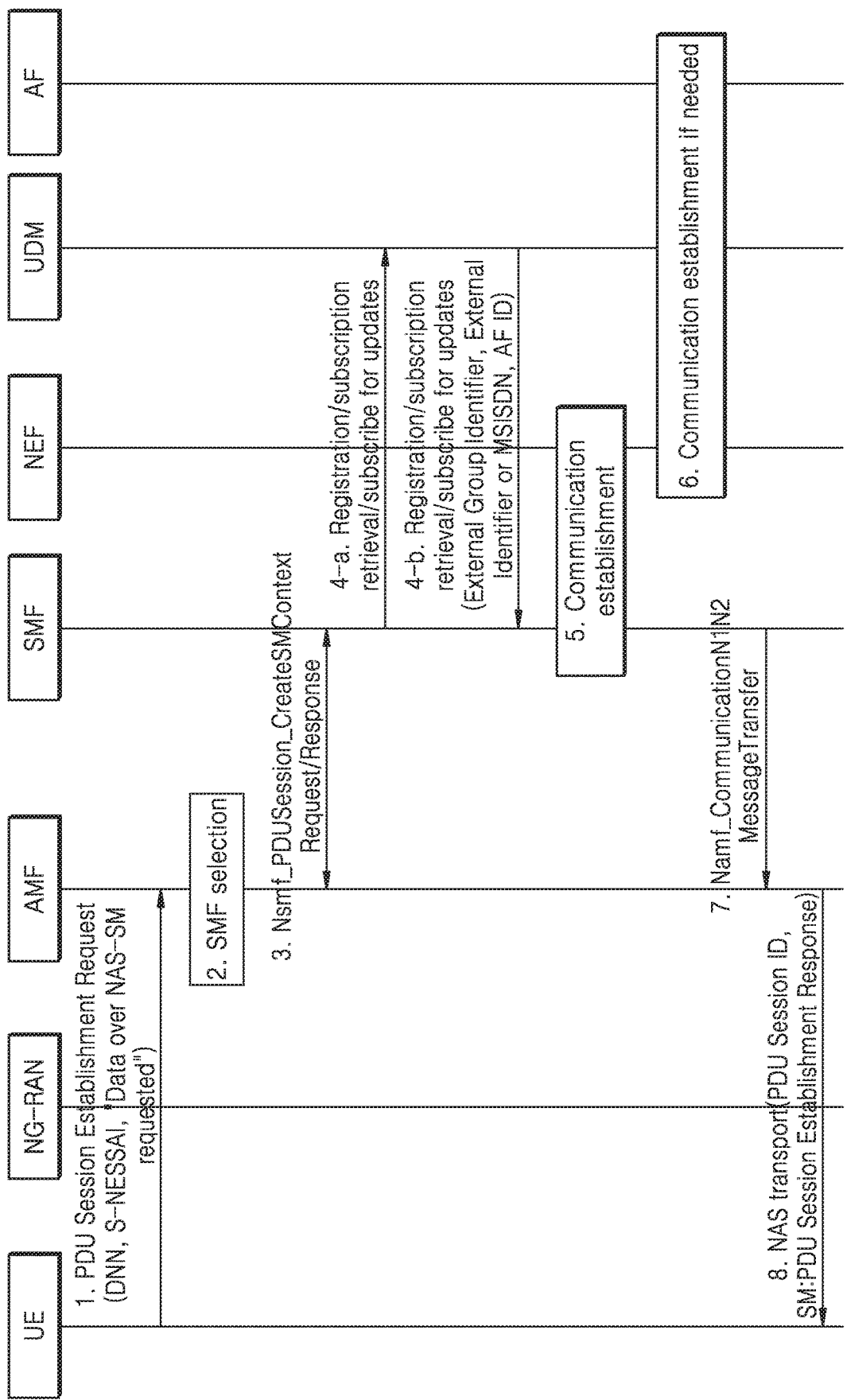
FIG. 2 is a diagram illustrating a Protocol Data Unit (PDU) session establishment method of a user equipment (UE) according to an embodiment of the disclosure.

FIG. 2 is a diagram illustrating a PDU session establishment method of a UE according to an embodiment of the disclosure. The UE may establish the PDU session so as to transmit non-IP data through a control plane.

Referring to FIG. 2, to this end, in operation 1, the UE may transmit a PDU session establishment request message. At this time, in order to transmit data over a network access server (NAS)-SM, that is, a control plane, the PDU session establishment request message may include an indication "data transfer over NAS-SM requested."

In operation 2, an AMF that receives the PDU session establishment request message may select an SMF capable of transmitting non-IP data. In addition, in operation 3, the AMF may transmit the message to the SMF.

In operation 4-a, the SMF may register the PDU session in a UDM and fetch session management subscription data. In this case, in operation 4-b, the SMF may fetch, from the UDM, at least one of an external identifier, a Mobile Station International Subscriber Directory Number (MSISDN), an external group identifier, or AF ID information of the UE so as to set the NIDD configuration. The above-described information is information shared between a network operator and a service provider in a service agreement between the network operator and the service provider. In addition to the above-described information, authorization token information may also be shared for authentication and authorization between the network operator and the service provider.

In operation 5, the SMF may select an NEF based on subscription data information and perform communication connection establishment with the selected NEF. The communication connection between the SMF and the NEF will be described below with reference to FIG. 3.

In operation 6, the NEF may establish a connection with the AF. To this end, a NIDD configuration setting procedure may be performed. This will be described below with reference to FIG. 4.

In operation 7, the SMF may transmit a PDU session establishment accept message to the AMF.

In addition, in operation 8, the AMF may transmit the received PDU session establishment accept message to the UE.

Figure 3:
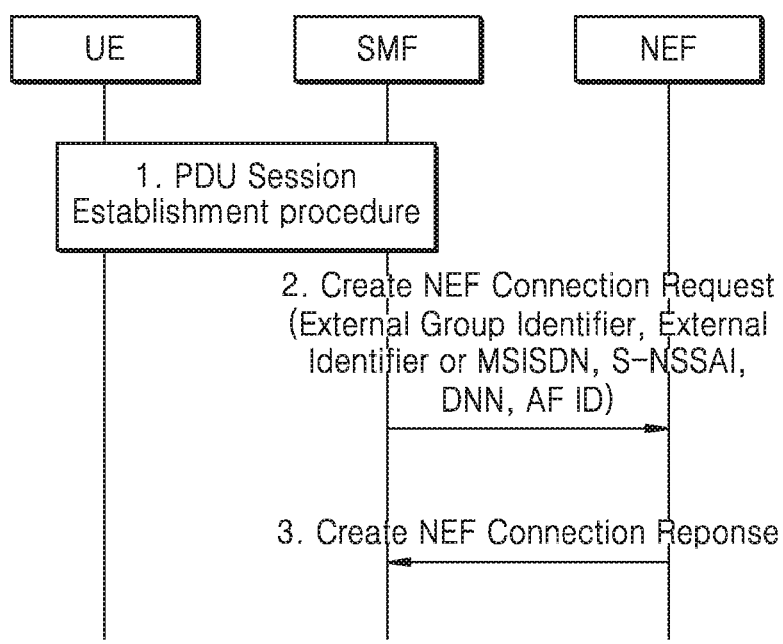
FIG. 3 is a diagram illustrating a procedure of establishing a connection between a Session Management Function (SMF) and a Network Exposure Function (NEF) according to an embodiment of the disclosure.

FIG. 3 is a diagram illustrating a procedure of establishing a connection between an SMF and an NEF according to an embodiment of the disclosure.

Referring to FIG. 3, in operation 1, during a PDU session establishment procedure, the SMF may receive, from a UE, a session management subscription data and data for setting an NIDD configuration.

In operation 2, the SMF may select an NEF based on subscription data information and transmit, to the NEF, data necessary for setting the NIDD configuration. The SMF may perform a NIDD configuration procedure, based on whether the NIDD configuration procedure is previously performed for the UE between the NEF and AF (application function). If no AF may have previously performed the NIDD Configuration procedure with the NEF, then the NEF initiates the NIDD Configuration procedure. For example, the SMF may transmit an NEF connection request to the NEF. The NEF connection request may include at least one of an external group identifier, an external identifier, an MSISDN, Single Network Slice Selection Assistance Information (S-NSSAI), a Data Network Name (DNN), or an AF ID.

In operation 3, the NEF may create an NEF PDU session context and transmit a response message to the SMF.

Figure 4:
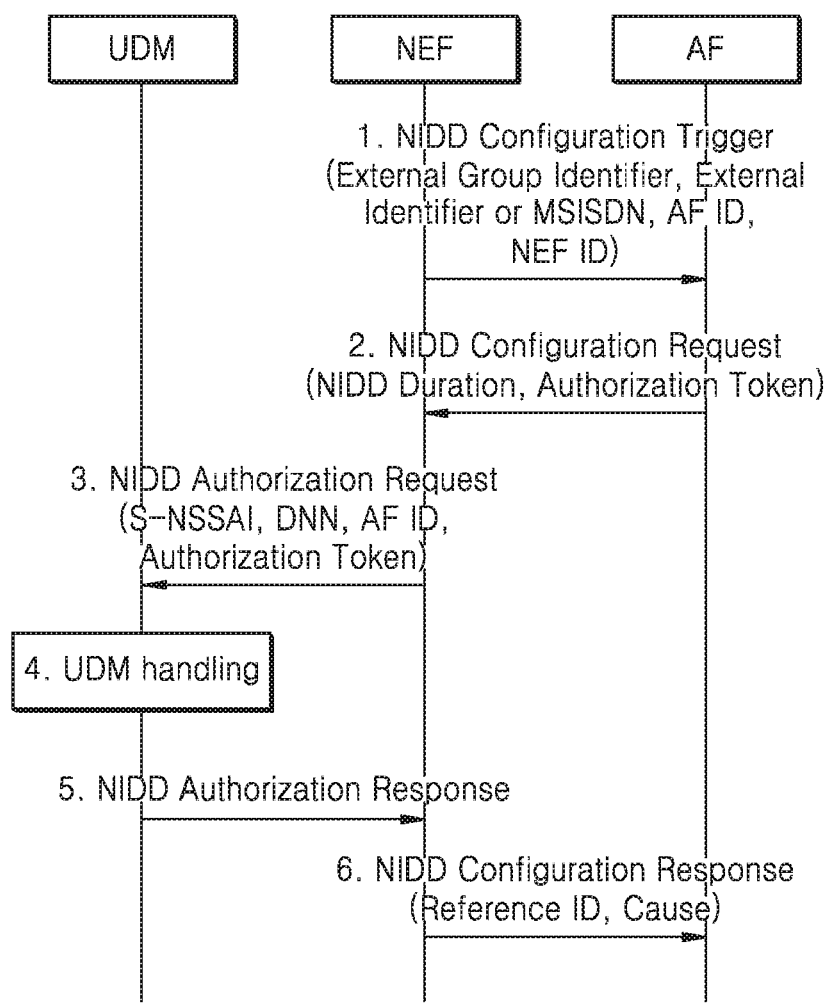
FIG. 4 is a diagram illustrating an NIDD configuration establishment procedure for establishing a connection between an NEF and an Application Function (AF) according to an embodiment of the disclosure.

FIG. 4 is a diagram illustrating an NIDD configuration setting procedure for establishing a connection between an NEF and an AF according to an embodiment of the disclosure.

Referring to FIG. 4, in operation 1, in a case in which an NIDD configuration with the AF is not set when the UE performs a PDU session establishment procedure so as to transmit non-IP data, the NEF may transmit an NIDD configuration trigger message to the AF. The NIDD configuration message may include at least one of an external group identifier, an external identifier, an MSISDN, an AF ID, or an NEF ID of the UE to which the NIDD configuration is to be set.

In operation 2, the AF that has received the NIDD configuration trigger message may transmit an NIDD configuration request message to the NEF. The NIDD configuration request message may include an NIDD duration and an authorization token necessary for authorizing the AF.

In operation 3, the NEF may transmit, to a UDM, a value received for authorizing the AF. In this case, an S-NSSAI value and a DNN value of a corresponding PDU session may also be transmitted to the UDM.

In operation 4, the UDM may compare the received authorization token value with the S-NSSAI value and the authorization token value for each DNN, which are stored in the service agreement.

In operation 5, as a result of the comparing in operation 4, when the received authorization token value is the same as the S-NSSAI value and the authorization token value for each DNN, which are stored in the service agreement, the UDM may transmit the authorization result value to the NEF via an NIDD authorization response message.

The NEF may assign a reference ID for setting the NIDD configuration and update an NEF PDU session context.

In operation 6, the NEF may transmit a result of a transmission NIDD configuration request to the AF via an NIDD configuration response message. The NIDD configuration response message may include information about the reference ID and a cause.

Figure 5:
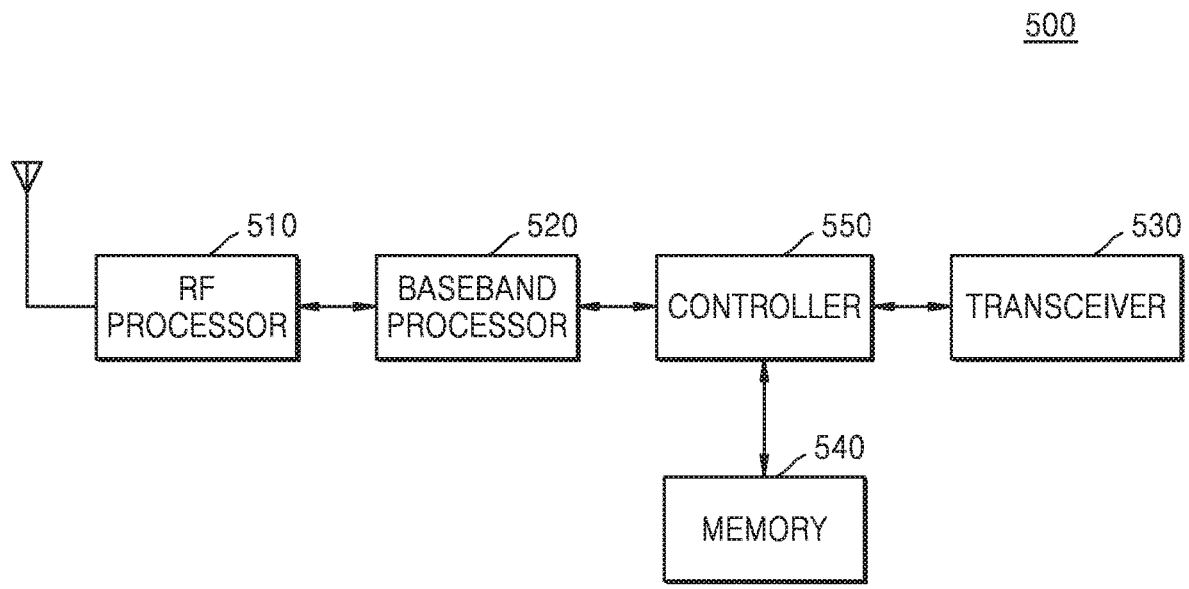
FIG. 5 is a block diagram of a Unified Data Management (UDM) apparatus according to an embodiment of the disclosure.

FIG. 5 is a block diagram of a UDM apparatus according to an embodiment of the disclosure.

Referring to FIG. 5, an UDM apparatus 500 may include an RF processor 510, a baseband processor 520, a transceiver 530, a memory 540, and a controller 550. However, this is only an example, and the components of the UDM apparatus 500 are not limited to the above-described example.

The RF processor 510 may perform a function for transmitting or receiving signals through a radio channel, such as signal band conversion and signal amplification. The RF processor 510 may up-convert a baseband signal provided from the baseband processor 520 into an RF band signal and transmit the RF band signal through an antenna, and may down-convert an RF band signal received through the antenna into a baseband signal. For example, the RF processor 510 may include a transmission filter, a reception filter, an amplifier, a mixer, an oscillator, a digital-to-analog converter (DAC), and an analog-to-digital converter (ADC). Although only one antenna is illustrated in FIG. 5, the UDM apparatus 500 may include a plurality of antennas. In addition, the RF processor 510 may include a plurality of RF chains. The RF processor 510 may perform beamforming. For beamforming, the RF processor 510 may adjust phases and amplitudes of signals transmitted or received through a plurality of antennas or antenna elements.

The baseband processor 520 may perform a conversion function between a baseband signal and a bit stream in accordance with the physical layer standard of a set radio connection technology. For example, when data is transmitted, the baseband processor 520 may encode and modulate a transmission bit stream to generate complex symbols. In addition, when data is received, the baseband processor 520 may demodulate and decode a baseband signal provided from the RF processor 510 to reconstruct a reception bit stream. For example, in accordance with an OFDM scheme, when data is transmitted, the baseband processor 520 may encode and modulate a transmission bit stream to generate complex symbols, map the complex symbols to subcarriers, and construct OFDM symbols through an inverse fast Fourier transform (IFFT) operation and cyclic prefix (CP) insertion. In addition, when data is received, the baseband processor 520 may divide a baseband signal provided from the RF processor 510 on an OFDM symbol basis, reconstruct signals mapped to subcarriers through a fast Fourier transform (FFT) operation, and reconstruct a reception bit stream through demodulation and decoding. The baseband processor 520 and the RF processor 510 may transmit and receive signals as described above. Accordingly, the baseband processor 520 and the RF processor 510 may be referred to as a transmitter, a receiver, a transceiver, a communicator, or a radio communicator.

The transceiver 530 may provide an interface configured to communicate with other nodes in the network.

The memory 540 may store a basic program, an application program, and data, such as configuration information, for the operation of the UDM apparatus 500 described with reference to FIGS. 1 to 4. The memory 540 may store information about a bearer allocated to the connected UE, a measurement result reported from the connected UE, and the like. In addition, the memory 540 may provide stored data in response to the request of the controller 550.

The controller 550 may control overall operations of the UDM apparatus 500. For example, the controller 550 may transmit or receive signals through the baseband processor 520 and the RF processor 510 or through the transceiver 530. In addition, the controller 550 may record data to the memory 540 and may read data from the memory 540. To this end, the controller 550 may include at least one processor.

Figure 6:
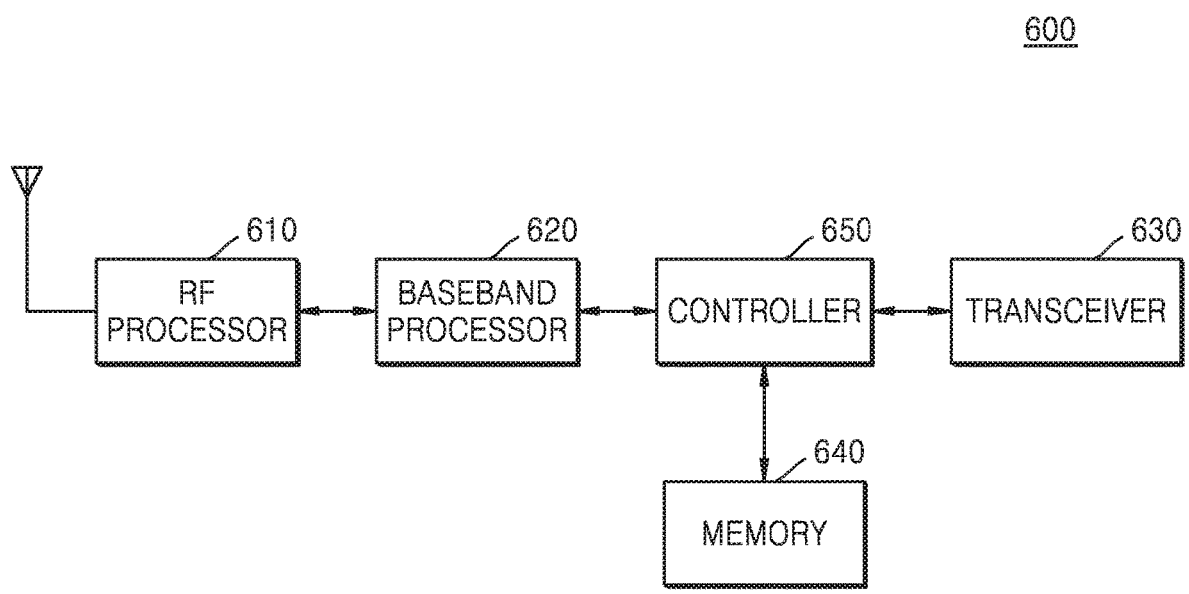
FIG. 6 is a block diagram of an NEF apparatus according to an embodiment of the disclosure.

FIG. 6 is a block diagram of an NEF apparatus according to an embodiment of the disclosure.

Referring to FIG. 6, an NEF apparatus 600 may include an RF processor 610, a baseband processor 620, a transceiver 630, a memory 640, and a controller 650. However, this is only an example, and the components of the NEF apparatus 600 are not limited to the above-described example.

The RF processor 610 may perform a function for transmitting or receiving signals through a radio channel, such as signal band conversion and signal amplification. The RF processor 610 may up-convert a baseband signal provided from the baseband processor 620 into an RF band signal and transmit the RF band signal through an antenna, and may down-convert an RF band signal received through the antenna into a baseband signal. For example, the RF processor 610 may include a transmission filter, a reception filter, an amplifier, a mixer, an oscillator, a DAC, and an ADC. Although only one antenna is illustrated in FIG. 6, the NEF apparatus 600 may include a plurality of antennas. In addition, the RF processor 610 may include a plurality of RF chains. The RF processor 610 may perform beamforming. For beamforming, the RF processor 610 may adjust phases and amplitudes of signals transmitted or received through a plurality of antennas or antenna elements.

The baseband processor 620 may perform a conversion function between a baseband signal and a bit stream in accordance with the physical layer standard of a set radio connection technology. For example, when data is transmitted, the baseband processor 620 may encode and modulate a transmission bit stream to generate complex symbols. In addition, when data is received, the baseband processor 620 may demodulate and decode a baseband signal provided from the RF processor 610 to reconstruct a reception bit stream. For example, in accordance with an OFDM scheme, when data is transmitted, the baseband processor 620 may encode and modulate a transmission bit stream to generate complex symbols, map the complex symbols to subcarriers, and construct OFDM symbols through an IFFT operation and CP insertion. In addition, when data is received, the baseband processor 620 may divide a baseband signal provided from the RF processor 610 on an OFDM symbol basis, reconstruct signals mapped to subcarriers through an FFT operation, and reconstruct a reception bit stream through demodulation and decoding. The baseband processor 620 and the RF processor 610 may transmit and receive signals as described above. Accordingly, the baseband processor 620 and the RF processor 610 may be referred to as a transmitter, a receiver, a transceiver, a communicator, or a radio communicator.

The transceiver 630 may provide an interface configured to communicate with other nodes in the network.

The memory 640 may store a basic program, an application program, and data, such as configuration information, for the operation of the NEF apparatus 600 described with reference to FIGS. 1 to 4. The memory 640 may store information about a bearer allocated to the connected UE, a measurement result reported from the connected UE, and the like. In addition, the memory 640 may provide stored data in response to the request of the controller 650.

The controller 650 may control overall operations of the NEF apparatus 600. For example, the controller 650 may transmit or receive signals through the baseband processor 620 and the RF processor 610 or through the transceiver 630. In addition, the controller 650 may record data to the memory 640 and may read data from the memory 540. To this end, the controller 650 may include at least one processor.

Figure 7:
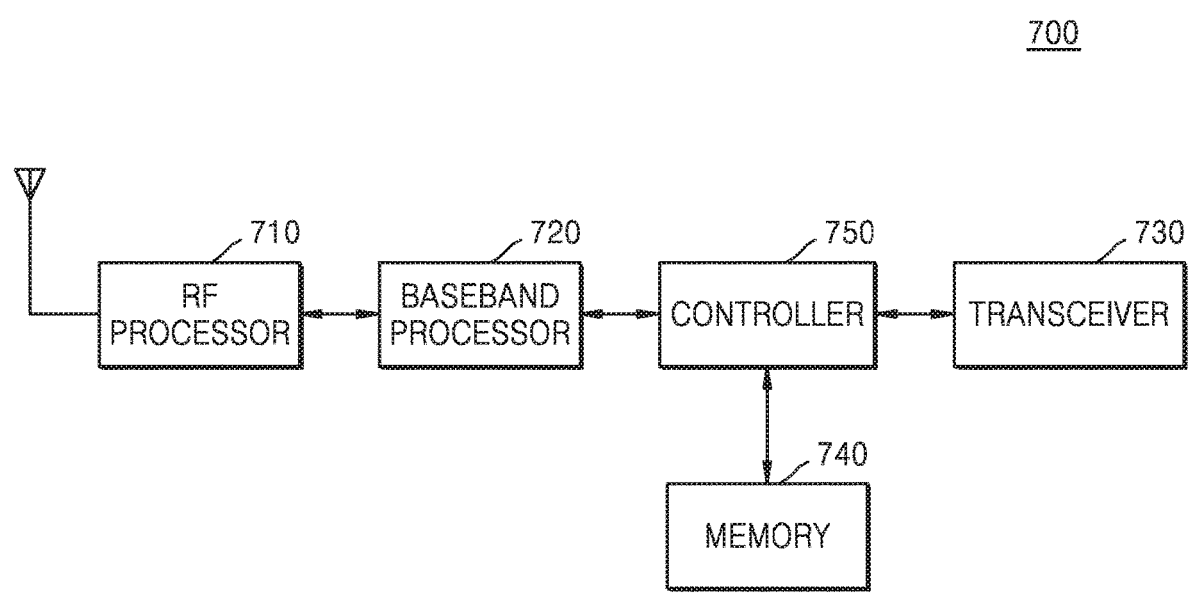
FIG. 7 is a block diagram of an AF apparatus according to an embodiment of the disclosure.

FIG. 7 is a block diagram of an AF apparatus according to an embodiment of the disclosure.

Referring to FIG. 7, an AF apparatus 700 may include an RF processor 710, a baseband processor 720, a transceiver 730, a memory 740, and a controller 750. However, this is only an example, and the components of the AF apparatus 700 are not limited to the above-described example.

The RF processor 710 may perform a function for transmitting or receiving signals through a radio channel, such as signal band conversion and signal amplification. The RF processor 710 may up-convert a baseband signal provided from the baseband processor 720 into an RF band signal and transmit the RF band signal through an antenna, and may down-convert an RF band signal received through the antenna into a baseband signal. For example, the RF processor 710 may include a transmission filter, a reception filter, an amplifier, a mixer, an oscillator, a DAC, and an ADC. Although only one antenna is illustrated in FIG. 7, the AF apparatus 700 may include a plurality of antennas. In addition, the RF processor 710 may include a plurality of RF chains. The RF processor 710 may perform beamforming. For beamforming, the RF processor 710 may adjust phases and amplitudes of signals transmitted or received through a plurality of antennas or antenna elements.

The baseband processor 720 may perform a conversion function between a baseband signal and a bit stream in accordance with the physical layer standard of a set radio connection technology. For example, when data is transmitted, the baseband processor 720 may encode and modulate a transmission bit stream to generate complex symbols. In addition, when data is received, the baseband processor 720 may demodulate and decode a baseband signal provided from the RF processor 710 to reconstruct a reception bit stream. For example, in accordance with an OFDM scheme, when data is transmitted, the baseband processor 720 may encode and modulate a transmission bit stream to generate complex symbols, map the complex symbols to subcarriers, and construct OFDM symbols through an IFFT operation and CP insertion. In addition, when data is received, the baseband processor 720 may divide a baseband signal provided from the RF processor 710 on an OFDM symbol basis, reconstruct signals mapped to subcarriers through an FFT operation, and reconstruct a reception bit stream through demodulation and decoding. The baseband processor 720 and the RF processor 710 may transmit and receive signals as described above. Accordingly, the baseband processor 720 and the RF processor 710 may be referred to as a transmitter, a receiver, a transceiver, a communicator, or a radio communicator.

The transceiver 730 may provide an interface configured to communicate with other nodes in the network.

The memory 740 may store a basic program, an application program, and data, such as configuration information, for the operation of the AF apparatus 700 described with reference to FIGS. 1 to 4. The memory 740 may store information about a bearer allocated to the connected UE, a measurement result reported from the connected UE, and the like. In addition, the memory 740 may provide stored data in response to the request of the controller 750.

The controller 750 may control overall operations of the AF apparatus 700. For example, the controller 750 may transmit or receive signals through the baseband processor 720 and the RF processor 710 or through the transceiver 730. In addition, the controller 750 may record data to the memory 740 and may read data from the memory 540. To this end, the controller 750 may include at least one processor.

Meanwhile, the embodiments of the disclosure provided in this specification and drawings merely present specific examples so as to describe the technical contents of the disclosure and help the understanding of the disclosure, and are not intended to limit the scope of the disclosure. For example, it will be apparent to those of ordinary skill in the art that other modifications based on the technical spirit of the disclosure may be implemented. In addition, the respective embodiments of the disclosure may be combined with each other when necessary. In addition, although the embodiments of the disclosure are presented based on the 5G wireless communication system, other modifications based on the technical spirit of the embodiments of the disclosure may be implemented in other systems.

According to the embodiments of the disclosure, when the UE establishes the PDU session for data transmission, the NIDD configuration setting procedure is performed in the core network, and therefore, data transmission of the UE may be performed without failure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing communication, by a network exposure function (NEF), in a wireless communication system, the method comprising:
receiving a message for connection request including information regarding non-internet protocol data delivery (NIDD) configuration for a user equipment (UE) from a session management function (SMF);
in case that a NIDD configuration procedure for the UE between the NEF and an application function (AF) is not performed previously, transmitting a message for triggering the NIDD configuration to the AF, based on the information regarding the NIDD configuration included in the message for the connection request;
receiving a message for requesting the NIDD configuration from the AF, as a response to the message for the triggering the NIDD configuration;
creating NEF protocol data unit (PDU) session context, based on the received message for requesting the NIDD configuration; and
transmitting a message for connection establishment response to the SMF, based on the received message for requesting the NIDD configuration.

2. The method of claim 1, wherein the message for connection request includes single network slice selection assistance information (S-NSSAI), data network name (DNN), an AF identifier (ID) and at least one of an external group identifier, an external identifier, or a mobile station international subscriber directory number (MSISDN).

3. The method of claim 1, further comprising:
transmitting a message for responding the NIDD configuration to the AF,
based on a NIDD authorization procedure between the NEF and unified data management (UDM).

4. The method of claim 1, wherein the message for triggering the NIDD configuration includes an AF identifier (ID) and a NEF identifier (ID).

5. The method of claim 3, further comprising:
transmitting a message for requesting NIDD authorization to the UDM based on the received message for requesting the NIDD configuration; and
receiving a message for responding the NIDD authorization from the UDM based on a result of the NIDD authorization.

6. A method of performing communication, by a session management function (SMF), in a wireless communication system, the method comprising:
receiving subscription information including a network exposure function (NEF) identifier (ID) for non-internet protocol data delivery (NIDD), based on a protocol data unit (PDU) session establishment procedure;
transmitting a message for connection request including information regarding NIDD configuration for a user equipment (UE), to a NEF corresponding to the NEF ID; and
in case that a message for requesting the NIDD configuration is received at the NEF from an application function (AF) and NEF PDU session context is created based on the message for requesting the NIDD configuration at the NEF, receiving a message for connection response, from the NEF,
wherein the message for requesting the NIDD configuration is received at the NEF as a response to a message for triggering the NIDD configuration, and
wherein the message for triggering the NIDD configuration is transmitted from the NEF to the AF, in case that a NIDD configuration procedure for the UE between the NEF and the AF is not performed previously.

7. The method of claim 6, wherein the message for connection request includes single network slice selection assistance information (S-NSSAI), a data network name (DNN), AF identifier (ID) and at least one of an external group identifier, an external identifier, or a mobile station international subscriber directory number (MSISDN).

8. The method of claim 6, wherein the subscription information further includes an external group identifier, an external identifier, a mobile station international subscriber directory number (MSISDN), single network slice selection assistance information (S-NSSAI) and a data network name (DNN).

9. A network exposure function (NEF) for performing communication in a wireless communication system, the NEF comprising:
a transceiver; and
at least one processor configured to:
receive, via the transceiver, a message for connection request including information regarding non-internet protocol data delivery (NIDD) configuration for a user equipment (UE) from a session management function (SMF),
in case that a NIDD configuration procedure for the UE between the NEF and an application function (AF) is not performed previously, transmit, via the transceiver, a message for triggering the NIDD configuration to the AF, based on the information regarding the NIDD configuration included in the message for the connection request,
receive, via the transceiver, a message for requesting the NIDD configuration from the AF, as a response to the message for the triggering the NIDD configuration,
create NEF protocol data unit (PDU) session context, based on the received message for requesting the NIDD configuration, and
transmit, via the transceiver, a message for connection response to the SMF, based on the received message for requesting the NIDD configuration.

10. The NEF of claim 9, wherein the message for connection request includes single network slice selection assistance information (S-NSSAI), a data network name (DNN), an AF identifier (ID) and at least one of an external group identifier, an external identifier, or a mobile station international subscriber directory number (MSISDN).

11. The NEF of claim 9, wherein the at least one processor is further configured to:
transmit, via the transceiver, a message for responding the NIDD configuration to the AF,
based on a NIDD authorization procedure between the NEF and unified data management (UDM).

12. The NEF of claim 9, wherein the message for triggering the NIDD configuration includes an AF identifier (ID) and a NEF identifier (ID).

13. The NEF of claim 11, wherein the at least one processor is further configured to:
transmit, via the transceiver, a message for requesting NIDD authorization to the UDM based on the received message for requesting the NIDD configuration, and
receive, via the transceiver, a message for responding the NIDD authorization from the UDM based on a result of the NIDD authorization.

14. A session management function (SMF) for performing communication in a wireless communication system, the SMF comprising:
- a transceiver; and
- at least one processor configured to:
  - receive, via the transceiver, subscription information including a network exposure function (NEF) identifier (ID) for non-internet protocol data delivery (NIDD), based on a protocol data unit (PDU) session establishment procedure,
  - transmit, via the transceiver, a message for connection request including information regarding NIDD configuration for a user equipment (UE), to a NEF corresponding to the NEF ID, and
  - in case that a message for requesting the NIDD configuration is received at the NEF from an application function (AF) and NEF PDU session context is created based on the message for requesting the NIDD configuration at the NEF, receive via the transceiver, a message for connection response from the NEF,
  - wherein the message for requesting the NIDD configuration is received at the NEF as a response to a message for triggering the NIDD configuration, and
  - wherein the message for triggering the NIDD configuration is transmitted from the NEF to the AF, in case that a NIDD configuration procedure for the UE between the NEF and the AF is not performed previously.

15. The SMF of claim 14, wherein the message for connection request includes single network slice selection assistance information (S-NSSAI), a data network name (DNN), AF identifier (ID) and at least one of an external group identifier, an external identifier or, a mobile station international subscriber directory number (MSISDN).

16. The SMF of claim 14, wherein the subscription information further includes
- an external group identifier, an external identifier, a mobile station international subscriber directory number (MSISDN), single network slice selection assistance information (S-NSSAI) and a data network name (DNN).

* * * * *

UNITED STATES PATENT AND TRADEMARK OFFICE
CERTIFICATE OF CORRECTION

PATENT NO. : 11,153,785 B2
APPLICATION NO. : 16/593501
DATED : October 19, 2021
INVENTOR(S) : Kisuk Kweon et al.

It is certified that error appears in the above-identified patent and that said Letters Patent is hereby corrected as shown below:

In the Claims

Claim 1, at Column 11, Line 24, please delete the word "establishment".

Signed and Sealed this
Eighteenth Day of April, 2023

Katherine Kelly Vidal
Katherine Kelly Vidal
*Director of the United States Patent and Trademark Office*